United States Patent Office 3,679,464
Patented July 25, 1972

3,679,464
COMPOSITION AND PROCESS FOR GLAZING CERAMIC WARE
Richard Andrew Eppler, Timonium, Md., assignor to SCM Corporation, Cleveland, Ohio
No Drawing. Application May 27, 1969, Ser. No. 828,345, now Patent No. 3,561,984, dated Feb. 9, 1971, which is a continuation-in-part of application Ser. No. 625,000, Mar. 22, 1967. Divided and this application Oct. 21, 1970, Ser. No. 82,803
Int. Cl. C03c 25/00
U.S. Cl. 117—175          6 Claims

ABSTRACT OF THE DISCLOSURE

This patent application describes a composition for glazing ceramic ware, preparations useful for making same, process for glazing bodies and substrates with same, and resulting coated ceramic bodies. The composition for glazing is characterized by containing a particulate vitrifiable material, at least a substantial fraction of which is in the particulate vitreous state, said vitrifiable material, after melting into a fluent vitreous state, being self-nucleating or autocrystallizable or crystallizable into a substantially dimensionally stable continuous vitreous film in which are dispersed crystals of low thermal expansion. The glazing composition is particularly suited for glazing low expansion ceramic whiteware. Set forth as useful preparations are special particulate lithia-alumina-silica and alkaline earth-alumina-silica systems modified with flux in proportion controlled to restrict the development of a primary low thermal expansion crystalline phase, some of said preparations being modified with zirconia. The glazing process comprises partially coating a ceramic body with the composition for glazing, firing the coated body at a temperature sufficiently high and for a time sufficiently long for converting the composition into a fluent continuous vitreous surface coating, then adjusting the temperature to a value at which crystal growth in the surface coating occurs at a measurable rate, and finally cooling the resultant glazed ware at a rate consistent with keeping the ware integral. The invention shows particular advantage for making glazes of adjustable and low thermal expansion for thermal shock and mechanical shock resistant ceramic whiteware, for example, dinnerware, cookware, ceramic tile, acoustical tiles of the mineral type, sanitary ware, artware and electrical and technical porcelain. The invention is specially adaptable to conventional "two-fire" glazing practice.

---

This application is a division of copending application S.N. 828,345 filed May 27, 1969, now U.S. Pat. 3,561,984 issued on Feb. 9, 1971 which is a continuation-in-part of application S.N. 625,000 filed Mar. 22, 1967 (now abandoned), the disclosures of which are incorporated herein by reference.

This invention relates to a composition for glazing ceramic ware, preparations useful for making said composition, process for glazing ceramic bodies and substrates with said composition, and the resulting coated ceramic bodies.

Heretofore compositions for glazing ceramic ware have not been available with the extremely low coefficients of thermal expansion possible by using this invention. A particular advantage of this invention is that it is specially adaptable to conventional glazing practice such as the U.S. "two-fire" glazing practice as well as other techniques. The invention is also particularly advantageous for making glazes of adjustable and very low thermal expansion for thermal shock- and/or mechanical shock-resistant ceramic whiteware, for example, dinnerware, cookware, ceramic tile, acoustical tiles of the mineral type, sanitary ware, art ware, and electrical and technical porcelain.

In one aspect the invention is a composition for glazing ceramic ware comprising 100 parts of particulate vitrifiable material, at least a substantial fraction of which initially is in the vitreous state, said vitrifiable material, after melting into a fluent vitreous state, being partially devitrifiable and crystallizable into a substantially dimensionally stable continuous, vitreous coating in which are dispersed crystals having average coefficient of thermal expansion less than $4 \times 10^{-6}/°C.$; 0–15 parts ceramic clay (other than a montmorillonite clay); 0–5 parts of a montmorillonite (such as bentonite) as a suspending assistant; 0–20 parts colorant or stain; 0–20 parts ceramic opacifier such as zirconia, titania, tin oxide, or cerium oxide; 0–0.4 part electrolyte for suspending, dispersing, peptizing and/or thickening such as calcium chloride, sodium silicate, sodium tetrapyrophosphate, methyl cellulose and sodium carboxy methyl cellulose; and 0–90 parts water.

Typical water concentrations in a resulting slip would be between about 15 and about 90 parts per 100 parts of the particulate vitrifiable material, for example, 20–40 parts for a dipping application of the glazing composition; 70–90 parts for roller coat application; and 60–80 parts for spray application. Other forms of application can include waterfall glazing of the ceramic body or substrate, or brushing or blade application of such slip.

The particulated vitrifiable material useful for partially devitrifying or crystallizing into the low expansion glaze having a continuous vitreous phase should be at least partially in the vitreous state initially. Suitably at least the water soluble constituents such as carbonates, borax, boric acid, sodium fluoride or potassium fluoride should be combined as vitreous matter so as to resist water solution. It is especially desirable to have no more than one percent by weight of the particulate devitrifiable material extractable in water at room temperature when 100 grams of the material are suspended in 1000 ml. of water. Advantageously, the particulate vitrifiable material is at least 10–15 percent by weight in the vitreous state and even higher to achieve best interaction of all the components in in subsequent firing and resulting glazing. For example, the particulate vitrifiable material can be petalite mixed with other materials which are entirely in the vitreous state as a frit or a mixture of frits. Preferably the entire particulate vitrifiable material in the composition other than the listed mill additions is a frit or a mixture of frits. The optional stains, opacifiers, clay, bentonite and other solids can be admixed intimately into the composition as mill additives. Wet grinding of the composition ordinarily is practiced, but the solids can be ground dry if desired, with water added subsequently to the premilled solids to make a slip. To achieve best utility and performance there should be no more than about 3 percent, and preferably no more than about ½ percent of the particles retained on a 325 mesh (Tyler Standard) screen after milling of the composition for application to a ceramic body.

The particularly low average coefficients of thermal expansion of the crystals formed when the particulate vitrifiable material is partially devitrified or crystallized is the basis for the special utility of the instant composition for glazing ceramic ware. These crystals formed in the devitrification should have average thermal expansion less than $4 \times 10^{-6}/°C.$, suitably no more than about $2.5 \times 10^{-6}$ down to about $1 \times 10^{-6}$, or even no measurable coefficient or a slightly negative one such as minus $1 \times 10^{-6}$. Average thermal expansion of a crystal means that the expansion is averaged over all crystallographic directions. These crystals are held in a matrix of continuous vitreous coating to yield a substantially non-porous glaze over the ceramic substrate, which glaze can be made glossy or matte as necessary or desired for utility in accordance with invention principles. The overall glaze composition after firing should have an overall coefficient of thermal expansion less than $5 \times 10^{-6}/°C$., advantageously about $1 \times 10^{-6}$ to $4 \times 10^{-6}/°C$., and preferably about $1 \times 10^{-6}$ to $3 \times 10^{-6}/°C$. The thermal expansion values spoken of in this specification in connection with glazes and bodies are the average linear thermal expansion coefficient of these materials for the temperature range of 50–350° C.

In order to obtain the glazing effectiveness, the particulate devitrifiable material must be meltable into a fluent vitreous state of comparatively low viscosity for flowing and spreading onto the ware and giving the glaze film. The particulate vitrifiable material of the composition can be thought of as basically two portions, the portion which in the glazing operation crystallizes or devitrifies to yield the necessary extremely low expansion crystals, and a flux which makes substantially the balance of the material into a continuous vitreous film-forming matrix that resists devitrification under the glazing conditions.

To distinguish the particulate vitrifiable material useful in compounding the composition for glazing from the composition as a whole, which can include various mill additions, said particulate vitrifiable material by itself hereafter will be referred to as a "preparation." In another respect of this invention, particularly useful preparations are set forth which yield upon firing the required fluency for glazing and subsequently are crystallizable or divitrifiable into a dimensionally stable continuous vitreous coating in which are dispersed the very low expasion crystals. The flux (which can be considered a diluent) reacts to make a glass of the preparation in the firing operation, the flux being fully soluble in the fluent melt.

The low expansion crystals formed on the ensuing crystallization or devitrification in the lithium-bearing preparations of this invention are primarily lithium alumino-silicate crystalline structures and can be the stuffed quartz structure as described in the Beall U.S. Pat. 3,252,811, β-eucryptite ($Li_2O \cdot Al_2O_3 \cdot 2SiO_2$) and/or β-spodumene ($Li_2O \cdot Al_2O_3 \cdot 4SiO_2$) (which has a coefficient not as low as that of stuffed quartz and therefore not considered as useful in all aspects of the invention.)

The composition of the uncrystallized preparation must be such as to thermally crystallize to the appropriate type and amount of low expansion lithium aluminosilicate phases to form a semicrystalline glaze having a composite or overall thermal expansion coefficient of less than $5 \times 10^{-6}/°C$. To insure the in situ crystallization of the appropriate lithium aluminosilicate crystalline phases in the glaze, the alumina ($Al_2O_3$) content of the uncrystallized preparation is quite critical.

According to the present invention, the glazing preparations must contain at least 17% by weight of alumina ($Al_2O_3$) to achieve these desired low expansions. When the $Al_2O_3$ content is less than 17% by weight the expansion of the resulting semicrystalline glaze is higher than $5 \times 10^{-6}/°C$. A minimum of 17% $Al_2O_3$ is therefore required to obtain preparations which are thermally, in situ, autocrystallizable to form low expansion, semicrystalline, glass-ceramic glazes having a coefficient of thermal expansion of less than $5 \times 10^{-6}/°C$. The thermal expansion of this semicrystalline glaze is a weighted mean of the expansion of the uncrystallized glassy matrix (relatively high expansion) and the expansion of the lithium aluminosilicate crystalline phase (relatively low expansion).

The reason for this unexpected criticality of $Al_2O_3$ is not presently fully understood, although it is suspected that when the $Al_2O_3$ content is less than 17% by weight, the crystallizing vitreous phase becomes alumina deficient as the crystallization progresses, and crystallization of the higher expansion lithium metasilicate ($Li_2O \cdot SiO_2$) and lithium disilicate ($Li_2O \cdot 2SiO_2$) crystalline phases occur at the expense of the low expansion lithium aluminosilicate phases. Regardless of the crystallization mechanism responsible, it can be stated that preparation compositions containing at least 17% by weight of $Al_2O_3$ crystallize to form glazes having thermal expansions of less than $5 \times 10^{-6}/°C$.

The criticality of this 17 weight percent minimum alumina content of the present glazing preparations will be more fully appreciated in view of the prior art. U.S. Pat. 3,368,712 (Sanford) discloses enameling compositions for metallic substrates. These enameling compositions yield semicrystalline enamels having coefficients of thermal expansion in the range of about $75-110 \times 10^{-7}/°C$. which are compatible with high expansion metallic substrates such as mild steel. The crystalline phases present are described as lithium titanium silicates having thermal expansion coefficients of about $80-90 \times 10^{-7}/°C$. This presence of these high expansion crystalline phases result in semicrystalline enamels having coefficients of expansion of $75 \times 10^{-7}/°C$. and higher which is unacceptable for use as a low expansion glaze. For instance, enamels 7, 9 and 11 from Table II of the Sanford patent contain about 15–16% alumina. These enamels are unsuitable for use as low expansion whiteware glazes because enamel 7 has a coefficient of expansion of $105 \times 10^{-7}/°C$., enamel 9 has a coefficient of expansion of $100 \times 10^{-7}/°C$. and enamel 11 has a coefficient of expansion of $130 \times 10^{-7}/°C$. All of these expansions are well above the expansion coefficient of $50 \times 10^{-7}/°C$. provided by the present compositions.

According to another feature of the present invention, it is unnecessary to incorporate a nucleant into the preparation to induce the nucleation or growth of the low expansion lithium aluminosilicate crystalline phases during the subsequent heat treatment. The amounts and proportions of $Li_2O \cdot Al_2O_3$ and $SiO_2$ in the preparation are specified so that the appropriate low expansion phases are self-nucleating or autocrystallizable under the influence of the energy supplied by the specified heat treatment.

This is an important advantage in the glazing of ceramic whitewares because nucleants often detract from the color and appearance of the finished glazed product. For instance, titania ($TiO_2$) is a commonly employed nucleant in crystallizable glazes. Unfortunately, the presence of this titania nucleant tends to cause a mottled appearance as well as a brown discoloration in the fired glaze. Mottling and brown discoloration are undesirable and commercially unacceptable for many whiteware applications. Additionally, titania nucleated glazes are often very low in gloss and have a dull or matte appearance. Self-nucleated glazes of the present invention can be bright, white or ivory in color and glossy.

Low expansion lithium aluminosilicate glazes containing titania nucleants have been studied in the past. For instance, see the article "Studies on the Glazes of Lithia Ceramics" by Maki and Tashiro, published in the Journal of the Ceramic Association of Japan, volume 74, No. 3, pages 89–93, 1966, wherein a glazing composition containing 50.4% $SiO_2$, 29.2% $Al_2O_3$, 5.9% $Li_2O$, 1.7% $ZrO_2$, 2.6% $P_2O_5$, 2.6% $TiO_2$, 1.0% $Na_2O$, 1.0% $K_2O$, 2.8% $B_2O_3$ and 2.8% $PbO$ is disclosed. While this composition does form a low expansion glaze, the glaze is mottled, dull or matte and has a yellow-brown discoloration which is not particularly desirable in whiteware applications where bright, white or ivory glossy surfaces are required. When this glazing composition is prepared and applied to a petalite body as disclosed in the article, the titania nucleants immediately form a slight yellow discoloration. This yellow discoloration becomes brownish-yellow under heat treatment specified. Apparently, the nucleation and crystallization mechanism disclosed in this Japanese article is similar to the mechanism disclosed by Stookey in U.S. Pat. 2,920,971 in that the glaze is matured at an elevated temperature (about 1300° C.) and the temperature is lowered to about 600° C. to allow the titania to nucleate submicroscopic crystalline nuclei, and then the temperature is raised to about 750° to 1000° C. to promote crystalline growth to form the semicrystalline ceramic glaze. The present compositions and processes eliminate the need for nucleating agents such as titania and also eliminates the need for the nucleation heat treatment. Accordingly, bright, white (non-yellow), glossy, ceramic whiteware glazes are presently attainable.

The crystalline phases discussed above are identified by X-ray diffraction analysis and accordingly the designation of the crystalline phases as "stuffed quartz," "β-eucryptite" and "β-spodumene" includes low expansion lithium aluminosilicate crystalline phases which are identified as stuffed quartz, β-eucryptite or β-spodumene by X-ray diffraction.

In preparations involving $BaO \cdot Al_2O_3 \cdot SiO_2$ the low expansion celsian crystalline phase can precipitate. In preparations involving $BaO \cdot MgO \cdot Al_2O_3 \cdot SiO_2$ systems an unnamed low expansion crystal can precipitate, this crystal approximating one equivalent of barium oxide and two of magnesium oxide per five equivalents of alumina and 12 equivalents of silica; it is referred to in the text, "Thermal Properties of Ceramics," page 29, by Smoke and Koenig (1958). In preparations involving $$Na_2O \cdot BaO \cdot Al_2O_3 \cdot SiO_2$$

the low expansion crystals nepheline and sometimes celsian can precipitate.

Accordingly, the inventive preparations yielding the resulting low expansion glaze containing the aforementioned low expansion crystals can be described as particulate mixtures providing a special resulting ingredient composition set. The broad set based on lithium oxide is designated Set I, and is described as follows:

(I)

Ingredient: Percent
$Li_2O$ ----- 0–23.
MgO ---- 0–17, 0.74 part of MgO replacing 1 part of $Li_2O$ when MgO is used, the subtotal sum of $Li_2O$ and MgO being at least 3%.
$Al_2O_3$ ---- 17–50.
$SiO_2$ ----- 36–78, the subtotal sum of the $Li_2O$, MgO, $Al_2O_3$ and $SiO_2$ being 70–95%.
$ZrO_2$ ----- 0–5.
Flux ----- 5–30.

wherein said flux is: $B_2O_3$, $K_2O$, F, PbO, $Na_2O$, CaO, SrO, ZnO, BaO up to 5%, or a mixture of same, and wherein the subtotal sum of the $ZrO_2$ plus said flux is 5–30%.

Advantageously for most practical operation and lower thermal expansion of the resulting glaze, the range of ingredients in Set I is restricted as follows to give Set Ia.

(Ia)

Ingredient: Percent
$Li_2O$ ----- 4–23.
MgO ---- 0–6, 0.74 part of MgO replacing 1 part of $Li_2O$ when MgO is used.
$Al_2O_3$ ---- 17–40.
$SiO_2$ ----- 36–74, the subtotal sum of the $Li_2O$, MgO, $Al_2O_3$ and $SiO_2$ being 80–95%.
$ZrO_2$ ----- 0–5.
Flux ----- 5–20.

wherein the subtotal sum of the $ZrO_2$ plus flux is 5–20%.

Preferably, for obtaining the most practical low expansion glazes useful in a wide variety of operations and meeting the many operational requirements in the ceramic industry for cookware and dinnerware manufacture, Set I is further restricted to Set Ib as follows:

(Ib)

Ingredient: Percent
$Li_2O$ ----- 7–16.
MgO ---- 0–2½, 0.74 part of MgO replacing 1 part of $Li_2O$ when MgO is used.
$Al_2O_3$ ---- 17–33.
$SiO_2$ ----- 48–63, the subtotal sum of the $Li_2O$, MgO, $Al_2O_3$ and $SiO_2$ being 88–95%.
$ZrO_2$ ----- 0–3.
Flux ----- 5–12.

and wherein the subtotal sum of the $ZrO_2$ plus flux is 5–12%.

It will be noted in the above composition sets that zirconia can be added in the proportions specified as a crystallization rate promoter or "catalyst." $ZrO_2$ crystallizes from the glaze as a minor phase in the form of a cubic crystal. In some preparations, particularly those yielding the lower thermal expansion coefficients, the presence of such minor phase yields a less glossy finish, whereas in other preparations, such as those approaching the maximum limit of overall thermal expansion herein, such minor phase imparts some additional glossiness to the resulting fired glaze.

Another inventive preparation yielding on firing the required continuous vitreous phase containing the very low expansion crystals in the necessary resulting glaze is the preparation designated herein as providing the resulting ingredient composition Set II as follows:

(II)

Ingredient: Percent
BaO ----- 5–65, but not less than 15% when no MgO or $Na_2O$ is present.
MgO ---- 0–12.
$Na_2O$ --- 0–15, the subtotal sum of the BaO plus MgO plus $Na_2O$ being from 12% to 65%.
$Al_2O_3$ --- 9–35.
$SiO_2$ ---- 18–65, the subtotal sum of the BaO, MgO, $Na_2O$, $Al_2O_3$ and $SiO_2$ being 70–95%.
Flux ---- 5–30.

wherein said flux is: $B_2O_3$, $K_2O$, F, PbO, CaO, SrO, ZnO or a mixture of same; and wherein ingredients of said preparation set are vitrified to an extent at least sufficient for rendering said preparation substantially water-resistant.

For advantageous practical operation, Set II can be restricted further as follows, designated as Set IIa:

(IIa)

Ingredient: Percent
BaO ----- 5–15.
MgO ---- 5–10.
$Na_2O$ ---- 0–5, the subtotal sum of the BaO plus MgO plus $Na_2O$ being from 12 to 25%.
$Al_2O_3$ --- 10–25.
$SiO_2$ ---- 45–65, the subtotal sum of the BaO, MgO, $Na_2O$, $Al_2O_3$ and $SiO_2$ being 80–95%.
Flux ---- 5–20.

In all instances the ingredients in the foregoing preparations are vitrified to an extent at least sufficient for rendering such preparation substantially water resistant as hereinbefore described (so that application of the preparations to a substrate cannot involve an aqueous leaching away of the necessary interacting materials and resulting disproportionation of the preparation). Because some of the probable reactions that occur upon firing are solid state reactions, extremely intimate and substantially homogeneous distribution of the reactants in close proximity to each other certainly is desirable for greatest reaction efficiency. Accordingly, it is advantageous that a substantial fraction of the preparation be in vitreous condition and preferably that the preparation is a single frit or an intimate mixture of frits to insure intimacy of the interacting components as well as water resistance.

In a further aspect of the invention there is presented a process for glazing a ceramic body which comprises:

(a) at least partially coating the body with a composition for glazing of the type described herein;
(b) firing the resulting coated body at a temperature sufficiently high and for a time sufficiently long for converting said composition into a fluent, continuous, vitreous surface coating;
(c) then adjusting temperature to a value at which crystal growth in said vitreous surface coating occurs within not substantially more than several hours;
(d) then cooling the resultant glazed ware at a rate consistent with keeping the ware integral.

As an advantageous embodiment of this process, the firing is performed at a temperature not substantially more than about 500° C. above the liquidus of the composition for glazing to suppress a generally undesirable irregular effect known as "orange peeling" and to yield a smooth glaze without such surface irregularities. In most instances the firing temperature will be about 100–300° C. or so above the liquidus of the composition for glazing. At the liquidus crystals can be present which prevent the necessary fluidity. The instantaneous fluid viscosity of the composition during the firing step shall be less than the softening point (as defined by the conventional ASTM procedure applied to glasses) which viscosity at softening point is about $10^{7.6}$ poises. For compositions for glazing utilizing Sets I, Ia, or Ib, a useful firing temperature is from about 975–1200° C.; for compositions for glazing utilizing compositions II and IIa preferred firing temperatures are 1100–1200° C.

The most practical procedure for adjusting temperature to a value at which crystal growth in the fluent vitreous coating occurs in a practical time, that is, in several minutes to at least within several hours, is to reduce the temperature after the firing step to a temperature below the liquidus of the highest melting crystal to be produced in the resulting vitreous matrix, although in some systems the temperature conceivably could be raised to obtain devitrification at the desired rate of crystal growth. As a practical matter the temperature stage for inducing crystal growth using Sets I, Ia and Ib is maintained at 650–850° C. and, using Sets II and IIa, at 700–1000° C. For each particular preparation and mill additions thereto it should be understood, however, that there will be optimum temperatures to achieve this devitrification at a desired practical rate in a time not substantially more than several, i.e., 20–30 hours, and usually in a much shorter overall time, e.g., as little as 8–10 minutes, to accommodate rapid production of glazed ware.

The final step in the glazing process is to cool at a rate that is not so fast as to cause undesirable cracking or crazing or undesirable strains in the resulting glazed object or its glazed surface, in other words, at a rate consistent with keeping the ware integral. The cooling can be done reasonably fast for production purposes, some systems being air-coolable from a temperature as high as about 816° C. to room temperature with the coated work merely maintained on a metal support. A practical rate of cooling is one to ten degrees C. per minute, and the cooling can be quite slow where long cooling times can be accommodated.

The instant invention is to be distinguished from conventional operations for making semi-crystalline glazes for artistic purposes because such conventional glazes contain crystals having average coefficient of thermal expansion above $4 \times 10^{-6}/°$ C. Such glazes are not useful for glazing high petalite or cordierite bodies or other bodies of similarly low thermal expansion.

Furthermore, the instant invention is to be distinguished from the conventional preparation of devitrified glass bodies typified by the well-known Pyroceram product and related processes (the term "Pyroceram" being a trademark of Corning Glass Works). Typically, in the preparation of such divitrified glass forms, the formulation and operation is directed to induce crystallization in glass at a fairly low temperature so as to maintain dimensional stability of the form. Practically a minimum viscosity of $10^9$ poises is required; preferably a minimum viscosity of $10^{11}$ poises should be used. In contrast, the present invention is directed to obtain working fluency of the molten devitrifiable material so it will coat a body efficiently, the viscosity in this condition being typically several powers of 10 less than the glass in the conventional glass devitrifying operation. Fluid viscosity of a typical inventive composition at useful firing temperatures was measured at between $10^5$ and $10^6$ poises using the concentric cylinder method (R. A. Eppler, J. Am. Cer. Soc. 49(12):679, December 1966).

As stated before, the instant particulate vitrifiable material in the composition for glazing must have at least a substantial fraction already in the vitreous state to obtain the desired interaction for the instant operation, and the most practical way to achieve the glazing is to heat the instant bisque coating beyond the liquidus of any crystals present, then reduce temperature for the crystal growing step. In contrast, the normal heating path for making low expansion devitrified bodies, e.g., as shown in U.S. Pats. 3,006,775; 3,252,811; 2,920,921; 3,161,528 and 3,272,610 is to make a glass body in the conventional sense, the body being formed in desired shape so that it is extremely highly viscous and dimensionally stable, give it a comparatively low temperature nucleating "soak" to maximize the viscosity within the body, then raise the temperature of the body to a temperature which is below the liquidus of the crystals being formed. U.S. Pat. 3,084,053 first converts the glass to frit, aggregates the frit into desired shape, then treats similarly.

The most suitable compositions for glazing according to this process are those containing particulate vitrifiable material providing one of the resulting ingredient composition sets described above, that is, Set I or Set II, advantageously Set Ia and Set IIa, and preferably Set Ib, and most preferably that set which is made up so as to be substantially entirely in the vitreous state as frit particles.

The coating step preparatory to firing of the coated ceramic body can be done as previously described in connection with the composition for glazing, above, by spraying, dipping and other conventional techniques. In its unfired condition, the thus-coated ware can be considered as being in the bisque condition. The conventional two-fire system is to make the body, fire it at some high temperature, cool it, then apply the glazing material and refire at a lower temperature than that at which the body was fired. Oher practices include that of coating the unfired (green) body and firing the glaze and body simultaneously. In some instances, manufacturers have found it desirable to form the body, fire it only to dryness at some low temperature, then apply the glaze and fire the coated body at a higher temperature. Hence, for my purposes, the body can be preformed and fired, or green, or merely dried before application of the glaze, although the two-fire system is used most generally in the U.S., is the most demanding on compositions for glazing; and the instant invention is specially suited for such system.

Particularly useful ceramic bodies for my glazing process and for making the resulting glazed article are those compounded with various low expansion ceramic materials to give such body a thermal expansion coefficient between about $1 \times 10^{-7}/°$ C. and about $60 \times 10^{-7}/°$ C. and preferably between about $5 \times 10^{-7}/°$ C. and about $20 \times 10^{-7}/°$ C. For glazing of such body the overall coefficient of thermal expansion of the instant compositions for glazing should be at least as low as the body to prevent crazing, advantageously about $10 \times 10^{-7}/°$ C. lower than the body; for compression glazing this differential most desirably is $20 \times 10^{-7}/°$ C. to $40 \times 10^{-7}/°$ C., the body being the higher in expansion. Accordingly, the particular glaze composition utilized here should be matched to the body in differential of coefficient of thermal expansion, the differential being in any case measured at the intended use temperature or over the use temperature range of the resulting glazed ware. For cookware thermal shock resistance is most desired over the operating temperature range of said ware. For dinnerware, compression glazing most desirably is practiced for obtaining mechanical shock resistance at ordinary room temperatures and dishwashing temperatures. Selection of the instant glaze for the appropriate body to get a combination of thermal shock resistance and mechanical shock resistance is, of course, quite possible within the limits of this invention.

Minerals generally used in making up the bodies are petalite, cordierite, zircon, sillimanite, low expansion fire clays and/or wollastonite. Most suitable bodies for the instant purpose are those containing at least about 25% by weight of a lithia-bearing ceramic mineral such as petalite or a body containing at least about 50% cordierite so that the body has desired low expansion properties. Typical bodies can be compounded for high compression glazing having as a primary phase petalite, or talc (to produce a substantial cordierite phase) or a zircon, or sillimanite (to produce a mullite phase) in combination with feldspars, clay, flint and/or silica. Bodies containing a high proportion of wollastonite also can be glazed suitably using glazes that fire at a temperature lower than that used in previously proposed glazing practice for this material (approaching 1200–1300° C.), this being a definite advantage of applying the principles of the invention to wollastonite glazing practice.

Basically, to obtain the lowest expansion glaze, only enough flux is used to obtain the desired continuous vitreous surface which is adequately flowable into a coating film during the firing step, this minimum proportion of flux being as low as about 5% for some of the lithia-containing preparations, and at least about 7% in the most practical preparations described herein. The upper limitation of the flux content on the preparation is determined by the overall thermal expansion coefficient of the composite glaze. Typical coefficients of thermal expansion relative to flux content for the instant lithium-based preparations are as follows: 12% flux gives about $20 \times 10^{-7}/°$ C.; 16% flux about $30 \times 10^{-7}/°$ C.; 20% flux about $40 \times 10^{-7}/°$ C. The maximum flux content in any useful case with such preparations is about 30%, and in some instances it must be less to keep within the necessary limits of thermal expansion.

Raw materials for providing the ingredients of the preparations are those conventional in the glass maker's art for supplying silica, alumina, and the other metal oxides for glass. The ingredients are provided alone or combined in various ways in minerals and chemicals. Purity of the raw materials mainly affects color of the glaze, thus the purer raw materials are more versatile.

The flux can be a single material, but most generally is a mixture or combination for efficiency or economy. The composition for glazing can be made boron-free, but $B_2O_3$ is advantageous to make the glaze most spreadable and fluent. Similarly, potassium oxide is desirable to promote gloss. The preferred flux is an approximately 50/50 mixture by weight of $B_2O_3$ and $K_2O$. The use of alkali metal oxides tends to raise the coefficient of thermal expansion of the vitreous phase in the resulting glaze. Flux materials that can be used include: $B_2O_3$—suitably in the form of borax, boric acid and/or calcium borate; $K_2O$—suitably in the form of potassium nitrate and/or potassium carbonate; F—suitably in the form of calcium fluoride potassium silica fluoride, cryolite, sodium fluoride, and/or potassium fluoride; PbO—suitably in the form of litharge and/or red lead ($Pb_3O_4$); soda—suitably in the form of sodium nitrate, sodium carbonate, borax, feldspar and/or sodium fluoride; CaO—suitably in the form of whiting (calcium carbonate), calcium fluoride, wollastonite and/or calcium feldspar; SrO—suitably in the form of strontium carbonate; and ZnO—suitably in this oxide form. The zirconia in the preparations can be added as such or, more commonly, as zircon ($ZrSiO_4$).

The following examples show various ways in which the invention has been practiced, but should not be construed as limiting the invention. All temperatures are shown in degrees centigrade. In this specification all parts are parts by weight and all percentages are weight percentages unless otherwise expressly indicated.

EXAMPLE 1

The following raw materials were weighed out and mixed in a twin-shell blender:

|  | Parts |
|---|---|
| Potassium nitrate | 313 |
| Boric acid | 267 |
| Lithium carbonate | 441 |
| Calcined alumina | 446 |
| Petalite | 2129 |

The batch was placed in a fireclay crucible and smelted in an electric furnace at 1430° C. for 6 hours. It was then poured into water to frit it and the frit allowed to dry. The frit then had the following composition:

|  | Percent |
|---|---|
| $SiO_2$ | 53.9 |
| $Al_2O_3$ | 27.0 |
| $Li_2O$ | 9.1 |
| $B_2O_3$ | 5.0 |
| $K_2O$ | 5.0 |

The frit was then dried and ball-milled for 16 hours. Subsequently, 100 parts of the ball-milled frit, 0.2 part bentonite, 4 parts kaolin clay and 40 parts water were ball-milled together for one hour and the mixture sprayed onto a bisque-fired body of the following composition:

|  | Percent |
|---|---|
| Petalite | 50 |
| Potash spar | 10 |
| Ball clay | 25 |
| Kaolin | 15 |

The body had been bisqued at 1260° and the coating was applied to a wet weight of one-half to one gram per square inch of body.

The glaze was then autocrystallized by firing the coated body as follows: heated at 500°/hr. to 975°; held one hour; cooled 180°/hr. to 750°; held one-half hour; cooled 180°/hr. to room temperature.

The result was a bright, high gloss, white, craze-free, continuous, non-porous, semicrystalline glaze coating on the tile body. The body itself had a coefficient of thermal expansion of $17.7 \times 10^{-7}/°$ C., and the corresponding coefficient of the coating was even lower in order to stay integral with such low expansion body.

EXAMPLE 2

The same kind of composition for glazing was sprayed onto the same kind of ceramic body as used in Example 1. The coated body then was fired at 1040° for 12 minutes in accordance with the Orth fast-fire process and apparatus shown in U.S. Pat. 3,322,413. The fired object was removed from the fast-fire furnace and allowed to cool in air. The result was a high gloss tile with a smooth, craze-free, non-porous, translucent, semicrystalline glaze coating.

EXAMPLE 3

The following raw materials were weighed out and mixed:

|  | Parts |
|---|---|
| Potassium nitrate | 248 |
| Boric acid | 214 |
| Lithium carbonate | 441 |
| Calcined alumina | 446 |
| Magnesia | 61.2 |
| Petalite | 2129 |

The batch was placed in a fireclay crucible and smelted in an electric furnace at 1430° C. for 6 hours. It was then poured into water to frit it and the frit allowed to dry. The frit then had the following composition:

|  | Percent |
|---|---|
| $SiO_2$ | 54 |
| $Al_2O_3$ | 27 |
| $Li_2O$ | 9 |
| MgO | 2 |
| $B_2O_3$ | 4 |
| $K_2O$ | 4 |

The frit was then dried and ball-milled for 16 hours. Subsequently, 100 parts of the ball-milled frit, 4 parts bentonite, and 45 parts water were ball-milled together for one hour and the mixture sprayed onto a bisque-fired body of the following composition:

|  | Percent |
|---|---|
| Uncalcined kaolin clay | 36.7 |
| Talc | 20.4 |
| Barium carbonate | 6.2 |
| Calcined kaolin | 36.7 |

The body had been bisqued at 1340° and the coating was applied to a weight of one-half to one gram per square inch of body.

The coated body then was fired as follows: heated at furnace rate (approximately 2 hours) to 1100°; held 2 hours; cooled in the furnace (approximately 10 hours) to room temperature.

The result was a moderate gloss, craze-free, non-porous glaze coating on the tile body.

EXAMPLE 4

The following raw materials were weighed out and mixed:

|  | Parts |
|---|---|
| Boric acid | 89 |
| Calcined alumina | 93 |
| $KNO_3$ | 104 |
| $Li_2CO_3$ | 139 |
| Petalite | 769 |

The batch was placed in a fireclay crucible and smelted in an electric furnace at 1430° C. for 6 hours. It was then poured into water to frit it and the frit allowed to dry. The frit then had the following composition:

|  | Percent |
|---|---|
| $Li_2O$ | 9 |
| $Al_2O_3$ | 22.5 |
| $SiO_2$ | 58.5 |
| $B_2O_3$ | 5 |
| $K_2O$ | 5 |

The frit was then dried and ball-milled for 16 hours. Subsequently, 100 parts of the ball-milled frit and 65 parts of water were ball-milled together for one hour and the mixture sprayed onto a bisque-fired body of the following composition:

|  | Percent |
|---|---|
| Wollastonite | 55 |
| Kaolin | 30 |
| Nepheline syenite | 15 |

The body had been bisqued at 1065° and the coating was applied to a weight of one-half to one gram per square inch of body.

The coating on the body was then autocrystallized by firing as follows: heating at 500°/hr. to 975°; holding 2 hours; cooling at 180°/hr. to 750°; holding one hour; and cooling (furnace rate) to room temperature.

The result was a white, translucent, smooth, non-crazed, non-porous semicrystalline glaze coating on the tile body.

EXAMPLE 5

The following two batches were weighed out and mixed separately from each other:

|  | Parts of— | |
|---|---|---|
|  | A | B |
| $KNO_3$ | 313 | 314 |
| Boric acid | 267 | 0 |
| $Li_2CO_3$ | 622 | 453 |
| Milled zircon | 0 | 223 |
| Calcined alumina | 546 | 463 |
| Petalite | 1,952 | 2,036 |

Each batch was placed in a crucible and smelted in an electric furnace at 1430° for 6 hours. Each batch was then fritted in water and dried. The frits then had the following compositions.

|  | Percent of— | |
|---|---|---|
|  | A | B |
| $Li_2O$ | 11.25 | 9 |
| $Al_2O_3$ | 29.25 | 27 |
| $SiO_2$ | 49.5 | 54 |
| $B_2O_3$ | 5 | 0 |
| $K_2O$ | 5 | 5 |
| $ZrO_2$ | 0 | 5 |

The frits then were dried and ball-milled for 16 hours. Subsequently, 50 parts of milled Frit A and of milled Frit B, one-half part bentonite, and 60 parts water were ball-milled together for one hour and the mixture sprayed onto a body like that described in Example 1. The coated body then was fired in the manner described in Example 3.

The result was a white, opaque glaze of moderate gloss, free of crazing and non-porous.

EXAMPLE 6

A composition like A of Example 5 was prepared and fritted in the manner of Example 5. Then 100 parts of this ball-milled frit, 5 parts of minus 325 mesh silica, 4 parts bentonite, and 60 parts of water were ball-milled together for one hour, and the mixture sprayed at the application weight of one-half to one gram per square inch onto a bisque-fired body (1260°) of the following composition:

|  | Percent |
|---|---|
| Petalite | 56 |
| Potash spar | 10 |
| Ball clay | 22 |
| Kaolin | 12 |

The coated body was fast-fired at 1150° for one hour in the manner of Example 2 and allowed to cool in air.

The result was a yellow, opaque glaze free of crazing, non-porous and glossy.

EXAMPLE 7

The following raw materials were mixed:

|  | Parts |
|---|---|
| Boric acid | 401 |
| Calcined alumina | 144 |
| $KNO_3$ | 180 |
| $Li_2CO_3$ | 715 |
| Petalite | 2126 |
| $K_2SiF_6$ | 149 |

The batch was placed in a fireclay crucible and smelted in an electric furnace at 1430° C. for 6 hours. It was then poured into water to frit it and the frit allowed to dry. The frit then had the following composition:

| | Percent |
|---|---|
| $Li_2O$ | 12.75 |
| $Al_2O_3$ | 17 |
| $SiO_2$ | 55.25 |
| $B_2O_3$ | 7.5 |
| $K_2O$ | 5 |
| F | 2.5 |

The frit was dried and ball-milled for 16 hours. One hundred (100) parts of it were mixed with 65 parts water and ball-milled for another hour. The mixture was sprayed onto a bisque-fired (1260°) body at a weight of one-half to one gram per square inch of body. The body composition was:

| | Percent |
|---|---|
| Petalite | 30 |
| $SiO_2$ | 15 |
| Potash spar | 15 |
| Ball clay | 25 |
| Kaolin | 15 |

The coated body was fired as follows: heated at 500°/hr. to 975°; held one hour; cooled at 180°/hr. to 700°; held one hour; cooled at 180°/hr. to room temperature.

The result was a glossy, translucent, uncrazed, non-porous glaze coating on the tile body.

EXAMPLES 8–18

Raw materials listed in Table I, below, were separately weighed out and mixed. Each batch was placed in a crucible and smelted and fritted as in Example 1. Each frit then had the composition given in Table II. Each frit then was dried and ball-milled for 16 hours. Subsequently, 100 parts of each frit were mixed with 4 parts bentonite and 40 parts water. Each such resulting slip was bill-milled for one hour more, then sprayed onto the bodies listed in Table III. Firing, crystal development and cooling to room temperature was done as in Example 3. The results are tabulated in Table IV.

EXAMPLE 19

The following raw materials were weighed out and mixed:

| | Parts |
|---|---|
| —200 mesh silica | 1088 |
| Potassium nitrate | 161 |
| Boric acid | 134 |
| Magnesium carbonate | 146 |
| Barium carbonate | 411 |
| Magnesia | 195 |
| Talc | 1414 |

The batch was placed in a fireclay crucible and smelted in an electric furnace at 1430° C. for 6 hours. It was then placed into water to frit it and the frit allowed to dry. The frit then had the following composition:

| | Percent |
|---|---|
| MgO | 8.36 |
| BaO | 10.55 |
| $Al_2O_3$ | 18.24 |
| $SiO_2$ | 57.85 |
| $K_2O$ | 2.5 |
| $B_2O_3$ | 2.5 |

The frit was then dried and ball-milled for 16 hours. Subsequently, 100 parts of the ball-milled frit, 4 parts bentonite and 40 parts water were ball-milled together for one hour and the mixture sprayed onto the body described in Example 1 at a weight of one-half to one gram per square inch of body.

The coated body was fired as described in Example 3.

The result was a brown, matte, craze-free, non-porous glaze on the tile body.

EXAMPLE 20

The same slip as described in Example 19 was prepared and milled. It was sprayed onto the body described in Example 3 at a weight of one-half to one gram per square inch of body.

The coated body was fired as described in Example 3.

The result was a cream white, matte, craze-free, non-porous glaze on the tile body.

TABLE I.—RAW MATERIAL BATCHES

| | Batch, parts | | | | | | | | | | |
|---|---|---|---|---|---|---|---|---|---|---|---|
| Raw materials | C | D | E | F | G | H | I | J | K | L | M |
| $KNO_3$ | 313 | 142 | 248 | | 313 | 313 | 313 | 313 | 313 | 314 | 314 |
| Boric acid | 267 | 214 | 214 | 267 | | | | | | | 267 |
| $Li_2CO_3$ | 622 | 447 | 441 | 442 | 442 | 442 | 442 | 442 | 442 | 453 | 453 |
| Calcined alumina | 546 | 454 | 446 | 446 | 446 | 446 | 446 | 446 | 446 | 463 | 311 |
| Petalite | 1,952 | 2,087 | 2,129 | 2,129 | 2,129 | 2,129 | 2,129 | 2,129 | 2,129 | 2,036 | 2,036 |
| $K_2SiF_6$ | | 119 | | | | | | | | | |
| $SrCO_3$ | | | 91.5 | | | | | | | | |
| $NaNO_3$ | | | | | 413 | | | | | | |
| MgO | | | | | | 153 | | | | | |
| Whiting | | | | | | | 275 | | | | |
| ZnO | | | | | | | | 150 | | | |
| CdO | | | | | | | | | 150 | | |
| $BaCO_3$ | | | | | | | | | | 195 | |
| Zircon | | | | | | | | | | 223 | 223 |

TABLE II.—OXIDE COMPOSITIONS

| | Batch designation | | | | | | | | | | |
|---|---|---|---|---|---|---|---|---|---|---|---|
| | C | D | E | F | G | H | I | J | K | L | M |
| Wt. percent: | | | | | | | | | | | |
| $Li_2O$ | 11.25 | 9 | 9 | 9 | 9 | 9 | 9 | 9 | 9 | 9 | 9 |
| MgO | | | | | | 5 | | | | | |
| $Al_2O_3$ | 29.25 | 27 | 27 | 27 | 27 | 27 | 27 | 27 | 27 | 27 | 22 |
| $SiO_2$ | 49.5 | 54 | 54 | 54 | 54 | 54 | 54 | 54 | 54 | 54 | 54 |
| $B_2O_3$ | 5 | 4 | 4 | 5 | | | | | | | 5 |
| $K_2O$ | 5 | 4 | 4 | | 5 | 5 | 5 | 5 | 5 | 5 | 5 |
| F | | 2 | | | | | | | | | |
| SrO | | | 2 | | | | | | | | |
| $Na_2O$ | | | | 5 | | | | | | | |
| CaO | | | | | | | 5 | | | | |
| ZnO | | | | | | | | 5 | | | |
| CdO | | | | | | | | | 5 | | |
| BaO | | | | | | | | | | 5 | |
| $ZrO_2$ | | | | | | | | | | 5 | 5 |

TABLE III.—BODY COMPOSITION USED

| | Example number | | | | | | | | | |
|---|---|---|---|---|---|---|---|---|---|---|
| | 8 | 9 | 10 | 11 | 12 | 13 | 14 | 15 | 16 | 17 | 18 |
| Composition | Same as Ex. 1. | Same as Ex. 3. | Same as Ex. 1. | Same as Ex. 1. | Same as Ex. 1. | Same as Ex. 1. | Same as Ex. 3. | Same as Ex. 3. | Same as Ex. 1. | Same as Ex. 3. | Same as Ex. 1. |

TABLE IV.—RESULTS

| | Frit (from Table II) | | | | | | | | | | |
|---|---|---|---|---|---|---|---|---|---|---|---|
| | C | D | E | F | G | H | I | J | K | L | M |
| | Body number (from Table III) | | | | | | | | | | |
| Characteristics | 8 | 9 | 10 | 11 | 12 | 13 | 14 | 15 | 16 | 17 | 18 |
| Gloss | Moderate | Glossy | Low gloss | Dead matte | Dead matte | Low gloss | Low gloss | Matte | Matte | Low gloss | High gloss |
| Opacity | Opaque | Clear | Translucent | Opaque | Opaque | Opaque | Opaque | Opaque | Opaque | Opaque | Opaque |
| Color | White | Brown | White | Creamy | White | Creamy | Creamy | Yellow | Creamy | White | White |
| Surface condition | Smooth | Smooth | Smooth | Matte | Matte | Smooth | Smooth | Somewhat rippled | Matte | Smooth | Smooth |
| Crazing | No | No | No | No | No | No | No | No | No | No | No |
| Porosity | No | No | No | No | No | No | No | No | No | No | No |
| Average coefficient of thermal expansion over the range of 50–350°×$10^{-7}$/° C. | −8.0 | 11.0 | 19.9 | 20.8 | | | 31.4 | 10.0 | | 15.8 | 27.9 |

EXAMPLE 21

To further demonstrate the criticality of the 17 weight percent alumina content, the following glazes were prepared and evaluated.

Appropriate batch materials were separately smelted at 1430° C. for 6 hours, fritted in water and dried to yield the frit composition set forth below:

| | Percent of— | | |
|---|---|---|---|
| | 21-A | 21-B | 21-C |
| $Li_2O$ | 9 | 9 | 9 |
| $Al_2O_3$ | 18 | 22.5 | 27 |
| $SiO_2$ | 63 | 58.5 | 54 |
| $B_2O_3$ | 5 | 5 | 5 |
| $K_2O$ | 5 | 5 | 5 |

Three glazing slips were prepared by ball-milling each of the frits prepared above for 16 hours and subsequently further ball-milling 100 parts of each ball-milled frit with 45 parts of water and 4 parts of bentonite.

These glazing slips were then applied and autocrystallized onto bisque fired bodies by the method of Example 4. The bisque fired bodies had a composition similar to the body described in Example 4.

In each test, the result was moderate gloss, craze-free, non-porous, semicrystalline glaze on the bisque body. The glaze employing frit 21-A had a coefficient of expansion of about $49 \times 10^{-7}$/° C. The glaze using frit 21-B had a coefficient of expansion of about $42 \times 10^{-7}$/° C. The glaze employing frit 21-C had a coefficient of expansion of about $21 \times 10^{-7}$/° C. Since alumina (at the expense of silica) was the only variable in these series of frits, it is apparent that the alumina content is critical and alumina contents of 17 percent or more are required to achieve glazing compositions having coefficients of expansion of less than $50 \times 10^{-7}$/° C.

EXAMPLE 22

To further demonstrate the compositional criticality of the present invention, the following glazes were prepared and evaluated.

Appropriate batch materials were separately smelted at about 1300° C. for one hour, fritted in water and dried to yield the frit compositions (in weight percent) set forth below.

| | Percent of— | |
|---|---|---|
| | 22-A | 22-B |
| $SiO_2$ | 64 | 64 |
| $Al_2O_3$ | 17 | 17 |
| $Li_2O$ | 9 | 9 |
| $B_2O_3$ | 5 | 5 |
| $Na_2O$ | 5 | |
| $K_2O$ | | 5 |

Two glazing slips were prepared by ball-milling each of the frits prepared above with water and bentonite by the method described in Example 21.

Each of these glazing slips were then applied and autocrystallized onto bisque fired 60% petalite bodies having coefficients of expansion of about $2 \times 10^{-6}$/° C. The bodies had been bisque fired by the method of Example 4. In each test the result was a non-porous semicrystalline glaze which was very slightly crazed on the 60% petalite body.

Each of the glazing slips were then applied and autocrystallized onto bisque fired 30% petalite bodies having coefficients of expansion of about $5 \times 10^{-6}$/° C. The bodies had been bisque fired by the method of Example 4.

In each test the result was a glossy, craze-free, non-porous, semicrystalline glaze on the 30% petalite body.

These two series of tests (Examples 21 and 22) demonstrate the criticality of the 17 weight percent alumina content in that these compositions are more suitable for glazing bodies having a coefficient of expansion of about 50 than for gazing bodies having a coefficient of around 20.

Having thus described the invention, what is claimed is:

1. In a process for forming a substantially non-porous, semicrystalline glass ceramic glaze on a fired ceramic body by the "two-fire" process, said glaze having a coefficient of thermal expansion of less than $5 \times 10^{-6}$/° C., the improvement comprising the steps of:

(a) at least partially coating said body with a glaze comprising ceramic frit consisting essentially of:

| Ingredient: | Percentage |
|---|---|
| $Li_2O$ | 4–23. |
| MgO | 0–6, 0.74 part of MgO replacing 1 part $Li_2O$ when MgO is used, but a minimum of 4% $Li_2O$ being present. |
| $Al_2O_3$ | 17–40. |
| $SiO_2$ | 36–74, the subtotal sum of $Li_2O$, MgO, $Al_2O_3$, and $SiO_2$ being 80–95%. |
| $ZrO_2$ | 0–5. |
| Flux | 5–20. | wherein the subtotal of the $ZrO_2$, plus flux is 5–20% and wherein said flux is selected from the group consisting of: $B_2O_3$, $K_2O$, F, PbO, $Na_2O$, CaO, SrO, ZnO, BaO up to 5%, or a mixture of same, (b) firing the resulting coated body at a temperature sufficiently high and for a time sufficiently long for converting said composition into a fluent, continuous, vitreous surface coating;

(c) then lowering the temperature to a value at which crystal growth in said vitreous surface coating occurs within not substantially more than several hours; and (d) then cooling the resultant glazed body at a rate consistent with keeping the body integral.

2. The process of claim 1 wherein: the firing is performed at a temperature not substantially more than about 500° C. above the liquidus of said frit; the temperature adjustment thereafter is downward to a temperature below the liquidus of the highest melting crystal produced in the vitreous matrix of said surface coating, but not substantially more than about 300° C. below the liquidus of the primary low expansion crystal phase formed by crystallization of said surface coating; and the cooling rate of the ware is not substantially in excess of about 40° C. per minute.

3. The process of claim 2 wherein said frit consists essentially of:

| Ingredient: | Percentage |
|---|---|
| $Li_2O$ | 7–16. |
| MgO | 0–2½, 0.74 part of MgO replacing 1 part of $Li_2O$, when MgO is used, but a minimum of 7% $Li_2O$ being present. |
| $Al_2O_3$ | 17–33. |
| $SiO_2$ | 48–63, the subtotal sum of the $Li_2O$, MgO, $Al_2O_3$ and $SiO_2$ being 88–95%. |
| $ZrO_2$ | 0.3. |
| Flux | 5–12. | and wherein the subtotal sum of $ZrO_2$ plus flux is 5–12% and wherein said flux is selected from the group consisting of: $B_2O_3$, $K_2O$, F, PbO, $Na_2O$, CaO, SrO, ZnO, BaO up to 5%, or a mixture of the same.

4. In a fired ceramic body having a fired glaze frit coating thereon said body having been fired prior to the application of the glaze frit coating, said coating comprising a low expansion non-porous, semicrystalline glass ceramic glaze coating, said coating having a coefficient of expansion of less than $5 \times 10^{-6}/°$ C. the improvement wherein said glaze frit consists essentially of:

| Ingredient: | Percentage |
|---|---|
| $Li_2O$ | 4–23. |
| MgO | 0–6, 0.74 part of MgO replacing 1 part $Li_2O$ when MgO is used, but a minimum of 4% $Li_2O$ being present. |
| $Al_2O_3$ | 17–40. |
| $SiO_2$ | 36–74, the subtotal sum of $Li_2O$, MgO, $Al_2O_3$, and $SiO_2$ being 80–95%. |
| $ZrO_2$ | 0–5. |
| Flux | 5–20. | wherein the subtotal of the $ZrO_2$, plus flux is 5–20% and wherein said flux is selected from the group consisting of: $B_2O_3$, $K_2O$, F, PbO, $Na_2O$, CaO, SrO, ZnO, BaO up to 5%, or a mixture of same.

5. The article of manufacture of claim 4 which contains at least about 25% of a lithia-bearing ceramic mineral.

6. The article of manufacture of claim 4 which contains at least about 50% of cordierite mineral.

References Cited

UNITED STATES PATENTS

| | | | |
|---|---|---|---|
| 3,499,787 | 3/1970 | Inoue | 117—125 X |
| 3,463,647 | 8/1969 | Kosiorek et al. | 117—125 X |
| 3,404,027 | 10/1968 | Kosiorek | 117—125 X |
| 3,501,321 | 3/1970 | Margola | 117—125 X |
| 3,532,524 | 10/1970 | Petticrew | 117—125 X |
| 3,380,838 | 4/1968 | Sack | 106—48 X |

WILLIAM D. MARTIN, Primary Examiner

M. R. LUSIGNAN, Assistant Examiner

U.S. Cl. X.R.

117—169 A